United States Patent [19]

Vaniglia

[11] Patent Number: 5,022,952
[45] Date of Patent: * Jun. 11, 1991

[54] FIBER PLACEMENT MACHINE

[75] Inventor: Milo M. Vaniglia, Southgate, Ky.

[73] Assignee: Cincinnati Milacron Inc., Cincinnati, Ohio

[*] Notice: The portion of the term of this patent subsequent to Mar. 13, 2007 has been disclaimed.

[21] Appl. No.: 445,583

[22] Filed: Dec. 4, 1989

Related U.S. Application Data

[63] Continuation-in-part of Ser. No. 808,911, Dec. 13, 1985, Pat. No. 4,907,754.

[51] Int. Cl.$^5$ .............................................. B43M 3/00
[52] U.S. Cl. .................................... 156/441; 242/7.21
[58] Field of Search ............................ 242/7.21, 7.22; 156/169, 173, 425, 427, 428, 441

[56] References Cited

U.S. PATENT DOCUMENTS

| | | | |
|---|---|---|---|
| 3,146,926 | 9/1964 | Huffman et al. | 225/96.5 |
| 3,146,962 | 8/1964 | Hardwick | 242/7.21 |
| 3,363,849 | 1/1968 | McLarty | 242/7.21 |
| 3,378,427 | 4/1968 | McClean | 242/7.08 X |
| 3,616,078 | 10/1971 | Howard | 242/7.21 X |
| 3,775,219 | 11/1973 | Karlson et al. | 156/526 X |
| 3,853,282 | 12/1974 | Wentworth | 242/75.44 |
| 3,909,600 | 8/1975 | Hohn | 364/513 |
| 4,273,601 | 6/1981 | Weingart | 156/190 X |
| 4,292,108 | 8/1981 | Weiss et al. | 156/259 |
| 4,324,607 | 4/1982 | Dugger | 156/350 |
| 4,419,170 | 12/1983 | Blad | 156/361 |
| 4,420,121 | 12/1983 | Shawcross et al. | 242/76 X |
| 4,699,683 | 10/1987 | McCowen | 156/353 |
| 4,735,672 | 4/1988 | Blad | 156/361 |
| 4,822,444 | 4/1989 | Weingart et al. | 156/441 |
| 4,869,774 | 9/1989 | Wisbey | 156/523 |
| 4,872,619 | 10/1989 | Vaniglia | 156/361 X |
| 4,877,193 | 10/1989 | Vaniglia | 156/361 X |
| 4,907,754 | 3/1990 | Vaniglia | 242/7.21 |

FOREIGN PATENT DOCUMENTS

| | | | |
|---|---|---|---|
| 1569166 | 6/1969 | Australia . | |
| 58-144070 | 8/1983 | Japan | 156/425 |

OTHER PUBLICATIONS

Fiber Placement Process Study by Don O. Evons, Milo M. Vaniglia and Paul C. Hopkins, published in SAMPE 34th Symposium Book of Proceeding, May 8–11, 1989.
Cincinnati Milacron Company Newspaper "Milacron Today"—vol. 4, No. 6, Jun., 1989.
American Machinist, Sep. 1989, p. 27, "Composite Shapes by Tow Placement".

Primary Examiner—Daniel P. Stodola
Assistant Examiner—William G. Battista, Jr.
Attorney, Agent, or Firm—Thomas M. Farrell; Thomas L. Kautz

[57] ABSTRACT

A fiber placement machine includes a carriage assembly movable in an X direction along a base support adapted to rest on the floor, a cross slide pivotally mounted on the carriage having a multi-axis manipulator device at one end carrying a fiber placement head and a creel assembly mounted at the other end which supplies a number of individual fiber tows to the fiber placement head. Mechanisms associated with the carriage and cross slide, in addition to the multi-axis manipulator, are effective to move the fiber placement head along a number of axes with respect to the surface of a mandrel such that the individual fiber tows are pressed onto the mandrel by a compaction roller or shoe mounted to the fiber placement head which is maintained substantially perpendicular to the surface of the mandrel.

10 Claims, 4 Drawing Sheets

FIBER PLACEMENT MACHINE

CROSS-REFERENCE TO RELATED APPLICATIONS

This application is a continuation-in-part of U.S. Pat. No. 4,907,754 entitled "Fiber Placement Machine", which is owned by the same assignee as this invention.

FIELD OF THE INVENTION

This invention relates to fiber placement machines and, more particularly, to a machine capable of laying down a number of tows side-by-side onto a tool or form having a relatively complex shape.

BACKGROUND OF THE INVENTION

The use of reinforced plastics or composites in the fabrication of structural components has grown substantially in recent years. Composite structures are formed by overlapping layers of a "towpreg", i.e., reinforcement material such as graphite fiber impregnated with a matrix material such as epoxy. Composite structures have become increasingly popular as a replacement for metallic parts, particularly in high performance applications such as in the aircraft industry, because of the high strength to weight ratio, good corrosion resistance, good impact resistance, and high electrical and thermal resistance exhibited by composite parts.

One aspect of the composites industry which has restricted the use of composite parts in some applications is that traditionally many composite parts had to be fabricated by hand or with several manual operations. The technology of automating the formation of composite parts continues to evolve, but limitations still exist particularly in the formation of parts having a relatively complex shape, i.e., parts having contoured or arcuate surfaces as opposed to cylindrical or other standard shapes.

Early attempts to automate the formation of composite parts involved the use of filament winding machines employing a wet winding technique in which fibers of filamentary material are drawn through a resin bath mounted on a traversing carriage having a pay-out eye. A form or tool, carried on a rotating mounting structure, is located with respect to the carriage such that the resin impregnated fibers are guided under tension by the pay-out eye longitudinally along the rotating tool. The pay-out eye traverses the tool from end to end laying down successive layers of fibers until the desired wall thickness is built up on the tool. The resin or matrix material is cured on the tool, and then the tool is removed leaving the cured, wound composite structure. See, for example, U.S. Pat. Nos. 378,427; 3,146,926 and 3,363,849.

One advantage of filament winding machines is that the pay-out eye can be oriented with respect to the tool such that the fibers are laid down at various angles relative to the longitudinal axis of the tool. This permits the formation of a finished composite part in which the several layers of fibers forming the wall of the part are oriented in the direction in which the part will be loaded, thus providing maximum strength with minimum wall thickness. Despite this and other advantages, a number of problems or limitations are presented by current filament winding techniques. For example, in the formation of cylindrical-shaped objects, the continuous fibers traverse the tool longitudinally from end to end to form the individual layers of the wall of the part. This produces a buildup of fibers at the ends of the part, compared to the center section thereof, which wastes fiber material at the ends of the part if it is not needed there.

Another problem with conventional filament winding machines relates to "compaction pressure", i.e., the pressure with which the fibers are applied onto the surface of a tool. The fibers are guided through a pay-out eye in filament winding machines and are applied to the surface of the tool under tension. The compaction pressure is dependent upon the tension on the fiber, the curvature of the surface of a tool and the width of the fibers. Tools having complex shapes such as arcuate or contoured surfaces with "peaks and valleys", i.e., concave and convex areas located adjacent one another along the winding axis, present problems for filament winding machines because the tension wound fibers span the concave surface adjacent a convex area. This is because no means are provided to press or compact the fibers directly into the concave area. The lack of direct compaction pressure between the fibers and tool surface in filament winding machines also creates problems in the winding of box-shaped parts. Because the compaction pressure is dependent, in part, on the curvature of the tool surface, the fibers are laid down on the flat sides of the box with little or no compaction whereas the corners of the box are highly compacted. The box-shaped part is thus unevenly compacted by filament winding machines, and has a thinner wall thickness around the corners than the sides.

The problem of automatically forming more complex composite parts has been solved to some extent by tape laying machines such as disclosed, for example, in U.S. Pat. Nos. 3,616,078; 4,822,444; 4,273,601; 3,775,219; 4,292,108; and 4,419,170. Machines of this type lay down a relatively wide "tape" which is essentially a pre-impregnated group of continuous individual fibers oriented parallel to one another on a carrier material. These tapes are carried in a placement head supported by structure capable of manipulating the placement head relative to a tool or form about a number of axes. Unlike filament winding devices, tape laying machines are capable of accommodating more complex-shaped parts because the fibers in the tape are pressed or compacted directly onto the tool by a compaction roller or shoe carried on the placement head. The mechanisms which carry the placement head are effective to maintain the roller or shoe substantially perpendicular to the surface of the tool such that the tape is pressed against non-planar surfaces of the tool. As a result, tape laying machines are more versatile than filament winding apparatus for large, gently contoured parts and have been effective in automating the production of some parts which had previously been constructed entirely by hand or with a number of hand lay up operations.

While tape laying machines have provided an advance in the fabrication of composite parts, such machines also have limitations. One problem involves an unwanted buildup of composite layers at the small ends of a tapered tool and similar parts. There is no provision in tape laying machines for decreasing the numbers of fibers within the tape as the placement head reaches the smaller ends of a tapered tool, for example, and therefore more fiber material can be built up on the ends than the center of the tool.

Another problem with tape laying machines is that they are incapable of laying down the tape along an arcuate or curved path except where the arc or angle of the path is extremely large. As mentioned above, the tape consists of fibers oriented parallel to one another on a carrier material. If the placement head of the tape laying machine is moved in an arcuate path, the tape tends to wrinkle or buckle because all of the fibers in the tape are of the same length. In order for a tape laying machine to accommodate arcuate paths, the fibers along one edge of the tape must subtend a different length than those on the opposite edge so that the tape conforms to such an arcuate path. Variation in the length of the fibers within the tape is not possible in currently available tape laying machines.

A third generation of automated devices for the fabrication of composite parts is disclosed, for example, in U.S. Pat. No. 4,699,683 to McCowin. Apparatus of the type disclosed in the McCowin patent are referred to as "fiber placement" machines and differ from tape laying machines in that they apply a number of individual fibers or tows side-by-side onto a form or tool rather than a pre-formed tape that is reeled with a carrier material. Fiber placement machines include a creel assembly consisting of a number of spools of pre-impregnated fibers, known as towpregs, which are individually fed at independently controlled rates to a fiber placement head. The fiber placement head includes structure for handling each tow individually. This structure is effective to feed the several tows side-by-side to form a fiber band which is pressed onto the surface of the tool by a compaction roller or shoe. The fiber placement head also includes structure for individually cutting one or more of the tows so that they can be "dropped off" from the remaining tows being applied to the tool.

The ability to selectively cut individual tows within the fiber band has a number of advantages. One advantage of selectively cutting individual tows is that the fiber placement head can lay down the tows in an arcuate path. This is because the length of the individual tows can vary since each individual tow is allowed to subtend a different line length compared to adjacent tows forming the fiber band. Another advantage of cutting individual tows is that material savings are obtained in forming tapered parts and the like wherein one or more of the fibers can be "dropped off" or cut as the fiber placement head reaches the ends of the tool to avoid unwanted buildup of fiber thereat. A still further advantage of permitting cutting of each tow individually is that "windows", e.g., holes, cut-outs, etc., formed in the tool can be accommodated by dropping off one or more tows as the fiber placement head moves past so that the windows are uncovered or free of fiber material.

The apparatus disclosed in the McCowin U.S. Pat. No. 4,699,683 provides distinct improvements over filament winding apparatus and tape laying machines because of its capability of individually feeding and cutting the separate fibers which form the fiber band. But the McCowin apparatus may be deficient in certain applications due to several design aspects of such apparatus.

One problem with the apparatus disclosed in McCowin U.S. Pat. No. 4,699,633 involves the location of the creel assembly which supplies the individual tows. In the McCowin apparatus, the creel assembly is carried by the fiber placement head, i.e., it is mounted directly on the fiber placement head, and the tows are unwound from each spool and separately fed beneath the compaction roller or shoe for placement onto the tool. The problem with this design is that the creel assembly is bulky and adds substantial weight to the fiber placement head, the compaction roller or shoe of which must be maintained substantially perpendicular to the surface of the tool. A tool having a relatively complex shape requires substantial movement of the fiber placement head and this is made difficult by the added weight of the creel assembly, particularly at relatively high operating speeds.

Another problem with the apparatus disclosed in the McCowin U.S. Pat. No. 4,699,683 is that a relatively complicated and cumbersome gantry system is provided to move the fiber placement head with respect to a tool. Two spaced, horizontally extending beams, each supported on vertical legs, mount a carriage movable along the longitudinal axis of such beams. A vertical support is mounted to this carriage which, at its lower end, supports a rotary plate carrying the fiber placement head. All of these structures are large and require relatively complicated mechanisms to effect movement of the fiber placement head therealong, and the overall height of the apparatus is substantial which precludes its use in many manufacturing facilities. Additionally, the size of a tool to be laid up by the McCowin apparatus is limited in width dimension to the spacing between the horizontal beams of the fiber placement head support structure. That is, the motion of the fiber placement head in a direction perpendicular to the horizontal support beams is limited by the spacing therebetween. This may present problems in certain applications wherein the tool has a large width and length dimension.

SUMMARY OF THE INVENTION

It is therefore among the objectives of the invention to provide a fiber placement machine which is capable of operating at relatively high production speeds without limiting the motion of the fiber placement head, which is capable of accommodating a mandrel having essentially any length and width dimensions and which is relatively compact in construction.

These objectives are accomplished in a fiber placement machine which comprises a carriage movably mounted on a base support adapted to rest on the floor, a cross slide pivotally mounted on the carriage which supports a fiber placement head at one end and a creel assembly mounted to the cross slide for supplying a number of individual tows to the fiber placement head. Mechanisms associated with the carriage and cross slide are effective to move the fiber placement head along a number of axes with respect to a form or mandrel such that the tows are pressed onto the mandrel by a compaction roller or shoe which is maintained substantially perpendicular to the surface of the mandrel.

The overall construction of the fiber placement machine of this invention provides several improvements over devices of the type disclosed in the McCowin U.S. Pat. No. 4,699,683. One improvement relates to the compact construction of the fiber placement machine herein. The base support for the carriage rests upon the floor and has a minimal vertical height so that the carriage, cross slide and creel assembly can be mounted thereon while limiting the overall vertical height of the machine. Overhead gantries and other mounting structures such as utilized in the McCowin U.S. Pat. No. 4,699,683 are eliminated and the machine of this invention thus takes up less space and can be utilized in smaller manufacturing facilities.

Another advantage of the construction of this invention involves its ability to accommodate mandrels of essentially any size and shape. The cross slide which supports the fiber placement head is cantilevered outwardly from the base support and carriage in a direction substantially perpendicular to the longitudinal axis of the base support. No mounting structure for the carriage, cross slide or creel assembly interferes with the position or path of travel of the fiber placement head. As a result, the fiber placement head can be moved relative to a mandrel of essentially any width, length or height dimensions. In contrast, the fiber placement apparatus disclosed in the McCowin U.S. Pat. No. 4,699,683 employs a gantry in which the fiber placement head is mounted between a pair of horizontal beams mounted vertically above the floor. The fiber placement head can traverse between the spaced, horizontal beams in the McCowin apparatus, but not beyond, thus limiting the overall width of a mandrel which can be handled by such apparatus. No such limitations are present in the fiber placement machine of this invention.

Another advantage of the fiber placement machine herein involves the supply of tows to the fiber placement head. In this invention, the creel assembly is mounted on one end of the cross slide above the carriage and individual tows from the creel assembly are fed through rollers to the fiber placement head carried by the opposite, outwardly extending end of the cross slide. With this configuration, the fiber placement head can be made relatively lightweight and, in turn, it can be rapidly manipulated relative to the mandrel without creating excessive forces due to inertia and the like. This construction is an improvement over the McCowin apparatus disclosed in U.S. Pat. No. 4,699,683 wherein the creel assembly is mounted on the fiber placement head thus adding substantial weight thereto and increasing the difficulty of rapidly moving the fiber placement head during a production operation.

In another aspect of this invention, the cross slide is pivotally mounted at one end to the carriage by a tilt saddle and tilt supports which are effective to pivot the cross slide in a substantially vertical direction, i.e., along a Y axis, generally perpendicular to the longitudinal or X axis of the base support. The cross slide is also movable along a Z axis, thus providing a "tilt-cross feed" movement thereof, i.e., a combined tilting motion along the Y axis and axial movement along the Z axis. In one embodiment, a pair of arcuate-shaped tilt racks are mounted to opposite sides of the tilt saddle housing and are drivingly connected to a motor driven pinion mounted to the carriage. Rotation of the pinions causes the tilt saddle and cross slide to pivot in a vertical direction relative to the carriage and base support, i.e., along the Y axis, so that the fiber placement head is movable in a vertical direction with respect to the mandrel. In an alternative embodiment, a threaded shaft mounted to the cross slide is engageable with a nut such that relative rotation between the shaft and nut causes the cross slide to pivot in the vertical direction with respect to the carriage.

DESCRIPTION OF THE DRAWINGS

The structure, operation, and advantages of the presently preferred embodiment of this invention will become further apparent by consideration of the following description, taken in conjunction with the accompanying drawings, wherein.

DETAILED DESCRIPTION OF THE INVENTION

Figure 1:
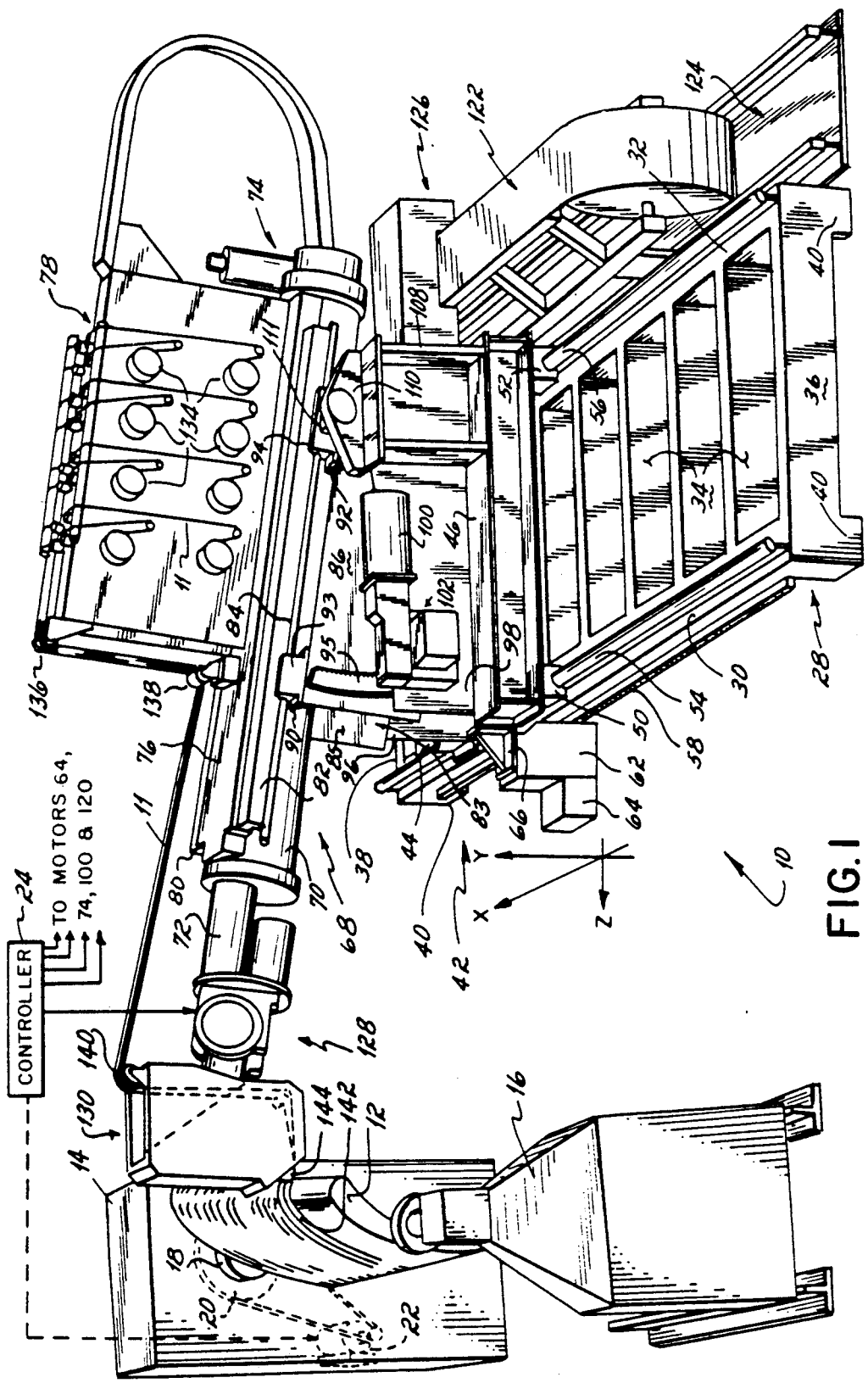
FIG. 1 is a perspective view of the fiber placement machine of this invention.

Referring now to FIG. 1, the fiber placement machine 10 of this invention is illustrated in position to apply a number of individual tows 11 to an arcuate-shaped mandrel 12 rotatably carried on a pair of spaced mandrel supports 14, 16. As used herein, the term "tow" is meant to refer to a strand of composite material consisting of a number of fibers preferably impregnated with a binder or matrix material such as epoxy. As schematically illustrated in FIG. 1, the mandrel support 14 has a chuck 18 which mounts the mandrel 12 and is driven by a pulley 20 drivingly connected to a motor 22. The operation of motor 22 is controlled by a controller 24 so that the mandrel 12 is rotated at a predetermined rate. The detailed construction and operation of the controller 24 forms no part of this invention per se and is thus not discussed in detail. Suitable controllers 24 for operating the fiber placement machine 10 include a controller such as disclosed in U.S. Pat. No. 3,909,600, the disclosure of which is incorporated by reference in its entirety herein, and a CNC control of the type sold under the designation 975 F Control by Cincinnati Milacron Inc., the assignee of this invention.

Figure 2:
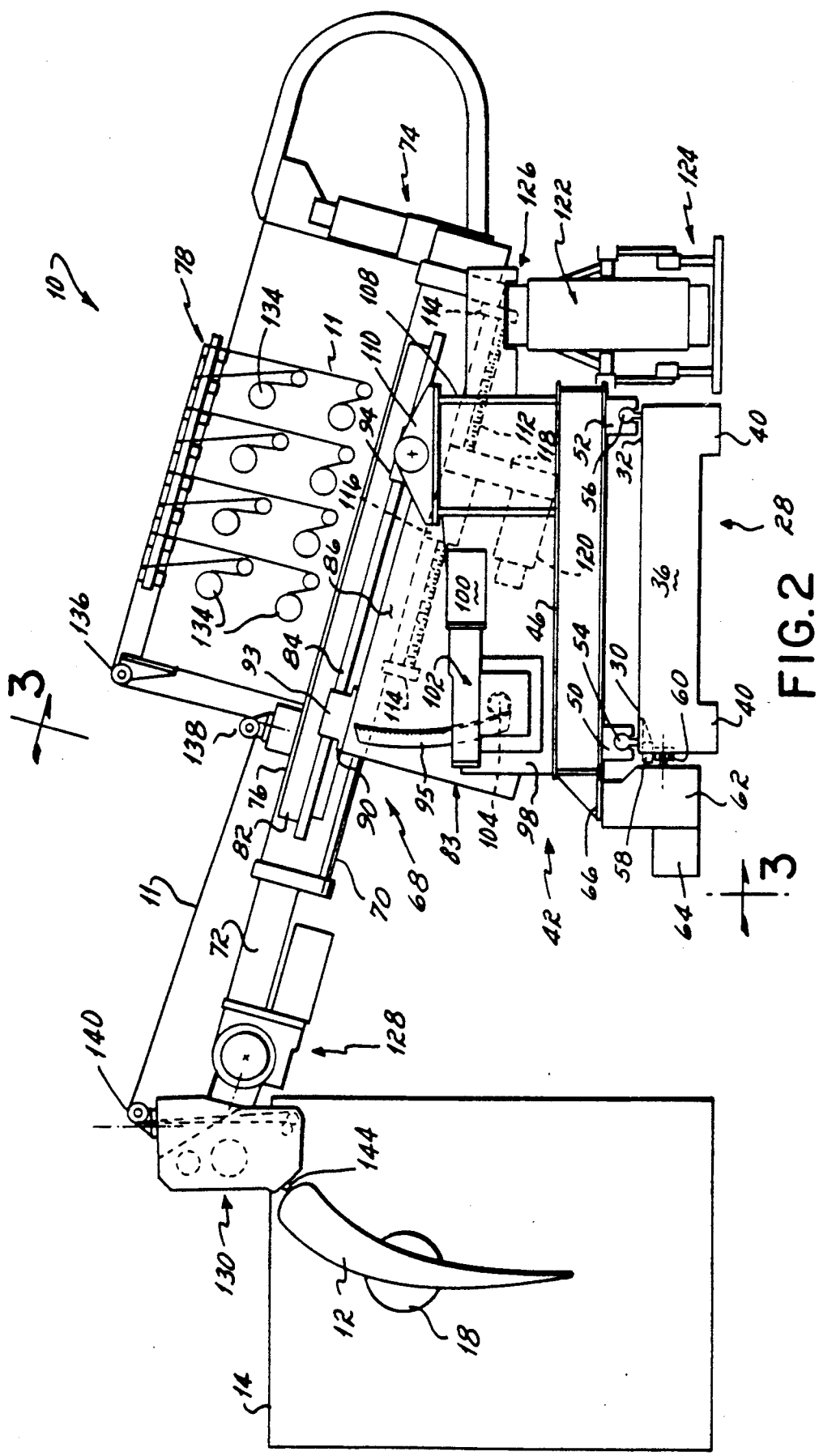
FIG. 2 is a side elevational view of the apparatus illustrated in FIG. 1.

Referring to the righthand portion of FIGS. 1 and 2, the fiber placement machine 10 is illustrated in a laterally spaced position with respect to the mandrel 12. The machine 10 comprises a base support 28 having substantially horizontally extending side rails 30, 32 which are interconnected by a number of spaced support beams 34. The side rails 30, 32 are connected at each end to end panels 36, 38 each of which is supported by relatively short vertical legs 40. As shown in FIGS. 1 and 2, the base support 28 is adapted to rest upon the floor and extends close to floor level so that the remaining structure of machine 10 can be supported thereon to form a structure having a limited vertical height.

Figure 3:
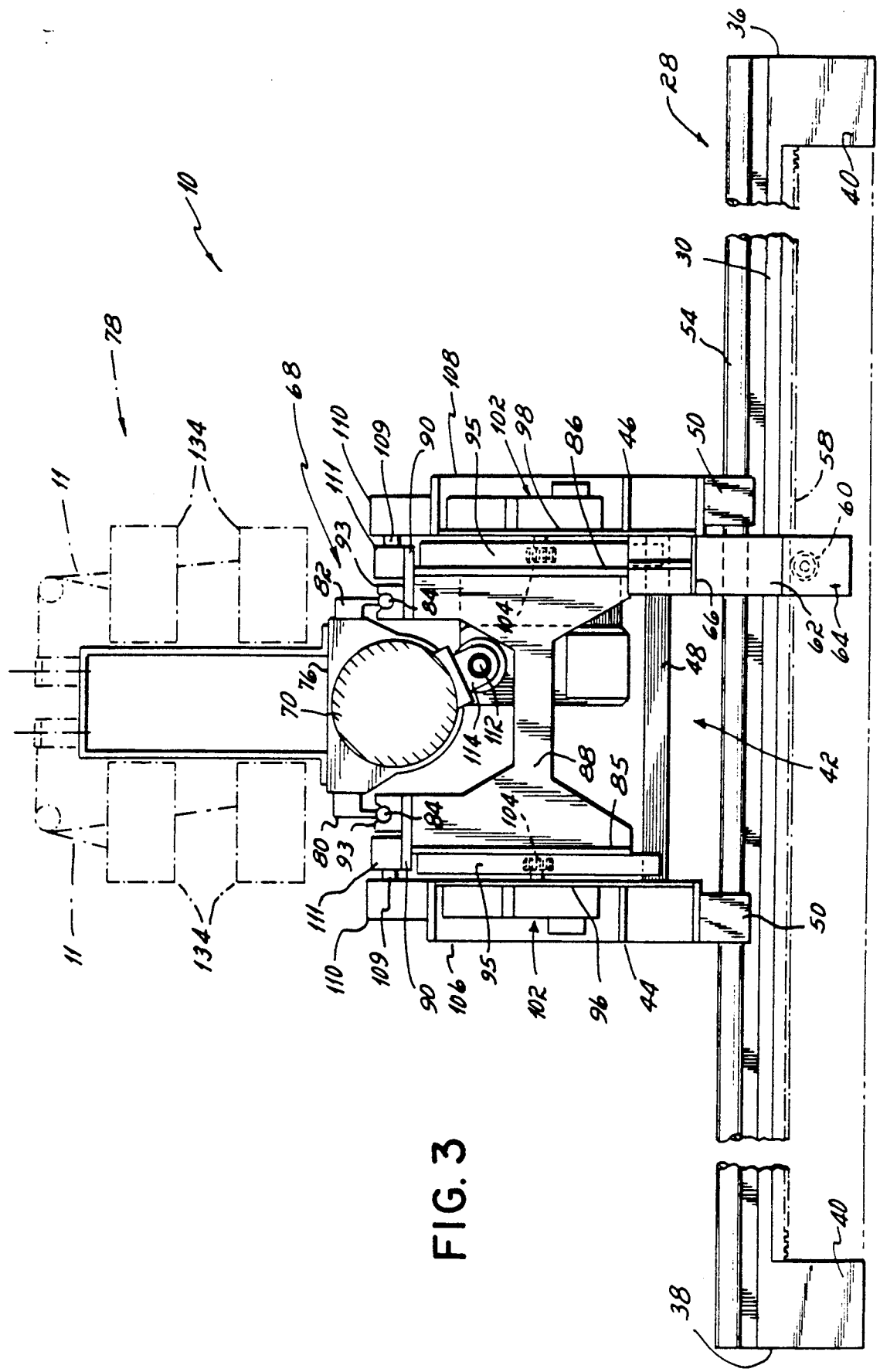
FIG. 3 is a cross sectional view of the apparatus herein taken generally along line 3—3 of FIG. 2, except showing the cross slide in a lowered position.

The base support 28 mounts a carriage 42 which comprises a pair of spaced beams 44 and 46 interconnected by rods 48, one of which is shown in FIG. 3. Each of the beams 44, 46 supports a bearing block 50 at one end and a bearing block 52 at the opposite end which slidably engage ways 54, 56, respectively, mounted atop the side rails 30, 32 of base support 28. Movement of the carriage 42 along the longitudinal axis of the base support 28, i.e., in an "X" direction, is effected by a rack and pinion drive. An elongated gear rack 58 is mounted to the underside of side rail 30 in base support 28. This gear rack 58 drivingly engages a pinion 60 which is connected to a gear box 62 and motor 64 carried by a support 66 fixedly attached to the beam 46 of carriage 42. Rotation of the pinion 60 by operation of the motor 64 and gear box 62 causes the carriage 42 to move along the gear rack 58 parallel to the longitudinal or X axis of the base support 28. See FIG. 2.

The carriage 42 includes structure which mounts a cross slide 68. The cross slide 68 has a cylindrical housing 70 which carries a forwardly extending mounting arm 72 drivingly connected by a shaft (not shown) to a motor 74 located at the rearward end of the housing 70.

The term "forward" as used herein refers to the lefthand side of FIGS. 1 and 2, and the term "rearward" refers to the righthand side thereof. The motor 74 is effective to rotate the mounting arm 72 with respect to the longitudinal axis of the housing 70 for purposes to become apparent below. The housing 70 of cross slide 68 carries a platform 76 which mounts a creel assembly 78 described below. The platform 76 has a pair of longitudinally extending arms 80, 82 on opposite sides thereof, each of which support a way 84.

In the presently preferred embodiment of FIGS. 1-3, the carriage 42 and cross slide 68 are pivotally connected to one another to permit tilting or pivotal movement of the forward end of cross slide 68 substantially along a Y axis as depicted in FIGS. 1 and 2. A tilt saddle 83 is connected to the cross slide 68 which comprises a unitary tilt saddle housing having a pair of spaced support plates 85, 86 and a center stiffener member 88 welded or otherwise permanently affixed thereto. The top end of each support plate 85, 86, and the stiffener 88, mounts a forward plate 90 and a rearward plate 92 which support forward and rearward bushings 93, 94, respectively. These bushings 93, 94 slidably receive the ways 84 mounted on opposite sides of the platform 76. Each of the support plates 85, 86 also mounts an arcuate-shaped tilt rack 95 at the forward end thereof.

A pair of side walls 96, 98 are fixedly mounted to the beams 44, 46, respectively, of carriage 42. Each of the side walls 96, 98 supports a motor 100 and gear box 102 drivingly connected to a pinion 104 which meshes with one of the tilt racks 95. The rearward end of each beam 44, 46 mounts a vertical column 106, 108, respectively, each of which supports a bearing 110. Each bearing 110 is pivotally connected by a shaft 109 to a rear bearing 111 mounted to each of the rearward plates 92 on opposite sides of the cross slide 68 to permit pivotal motion thereof.

The above-described mounting structure is effective to pivot or tilt the cross slide 68 generally along the Y axis depicted in FIGS. 1 and 2. In response to activation of the motors 100, the pinions 104 drivingly engage the arcuate tilt racks 95 causing the forward end of cross slide 68 to tilt upwardly or downwardly along the Y axis about the bearings 110.

As best shown in FIGS. 2 and 3, structure is also provided to move the cross slide 68 relative to the carriage 42 and base support 28 along a Z axis. A threaded shaft or screw 112 is fixedly attached to brackets 114 located at each end which are mounted to the housing 70 of cross slide 68. This screw 112 carries a nut 116 which is rotatably mounted in an axially fixed position on side wall 86. The nut 116 is drivingly connected by a belt 118 to a motor 120 which is also mounted on the side wall 86 of carriage 42. In response to operation of motor 120, the nut 116 is rotated by belt 118 causing the sCreW 112 to axially move relative to the nut 116. The cross slide 68 is carried by the screw 112 in a direction substantially along the Z axis, i.e., toward and away from the mandrel 12.

In the presently preferred embodiment, electrical power is supplied to the motors 64, 100 and 120 by a power supply 122 movable along a track 124. As the carriage 42 is moved longitudinally relative to the base support 28, the power supply 122 is carried therewith and maintains connection with a power coupling 126 associated with the carriage 42. The power coupling 126 and power supply 122 form no part of this invention per se, and are thus schematically illustrated herein.

Referring now to FIGS. 1 and 2, the mounting arm 72 carried at the forward end of cross slide 68 mounts a multi-axis manipulator, e.g., a roll-bend-roll type of robotic wrist 128 or other standard, commercially available manipulators. This robotic wrist 128 carries a fiber placement head 130 of the type disclosed in my copending application Ser. No. 07/445,201, filed Dec. 4, 1989 and entitled "Fiber Placement Head", the disclosure of which is incorporated by reference in its entirety herein. The fiber placement head 130 receives a total of sixteen individual composite tows 11, eight of which are shown in FIG. 1, from the creel assembly 78 carried on the platform 76 secured to the top of the cross slide 68. The creel assembly 78 includes sixteen individual creels 134 each of which supply a separate tow 11 over a fixed position roller 136 and redirect roller 138 both mounted to the creel assembly 78, and a second redirect roller 140 mounted to the fiber placement head 130. The two redirect rollers 138 and 140 function to maintain continuous alignment of the individual tows 11 between the creel assembly 78 and fiber placement head 130 as the fiber placement head 130 is manipulated by the robotic wrist 128. The structure and operation of the redirect rollers 138, 140 is disclosed in detail in U.S. Pat. No. 4,877,193 and entitled "Redirect Roller Apparatus For Fiber Placement Machine" to Vaniglia, and U.S. Pat. No. 4,872,619 and entitled "Servo Driven Redirect Roller Apparatus For Fiber Placement" to Vaniglia, the disclosures of which are incorporated by reference in their entireties herein. The fiber placement head 130 is effective to lay down the individual tows 11 side-by-side onto the surface of the mandrel 12 to form an essentially continuous fiber band 142

The various motions obtained in the fiber placement machine 10 of this invention are all intended to orient the fiber placement head 130 with respect to the mandrel 12 such that a compaction roller or shoe 144 carried by the fiber placement head 130 is maintained substantially perpendicular to the surface of the mandrel 12 at all times during the fiber placement operation to press the fiber band 142 thereagainst. All of the motions of the fiber placement head 130 are controlled by the controller 24 in sequence with the rotation of the mandrel 12 by mandrel supports 14, 16.

For example, movement of the fiber placement head 130 longitudinally relative to the mandrel 12 is obtained by movement of the carriage 42 along the ways 54, 56 of base support 28 as described above. The connection between the pinions 104 and arcuate tilt racks 95 is effective to tilt the cross slide 68 and fiber placement head 130 in a substantially vertical direction relative to the mandrel 12, and this motion is combined with a transverse or cross feed motion along the Z axis obtained by operation of the screw 112 and nut 116. In addition, the robotic wrist 128 is effective to produce movement of the fiber placement head 130 along three or more axes, as desired. Each of these movements of the carriage 42, cross slide 68, and robotic wrist 128 are coordinated by the controller 24 with the rotation of mandrel 12 to insure that the tows 132 are applied in the proper location on mandrel 12 and that such tows 132 are compacted onto the mandrel 12 by the compaction roller or shoe 144 oriented perpendicularly to the mandrel surface.

Figure 4:
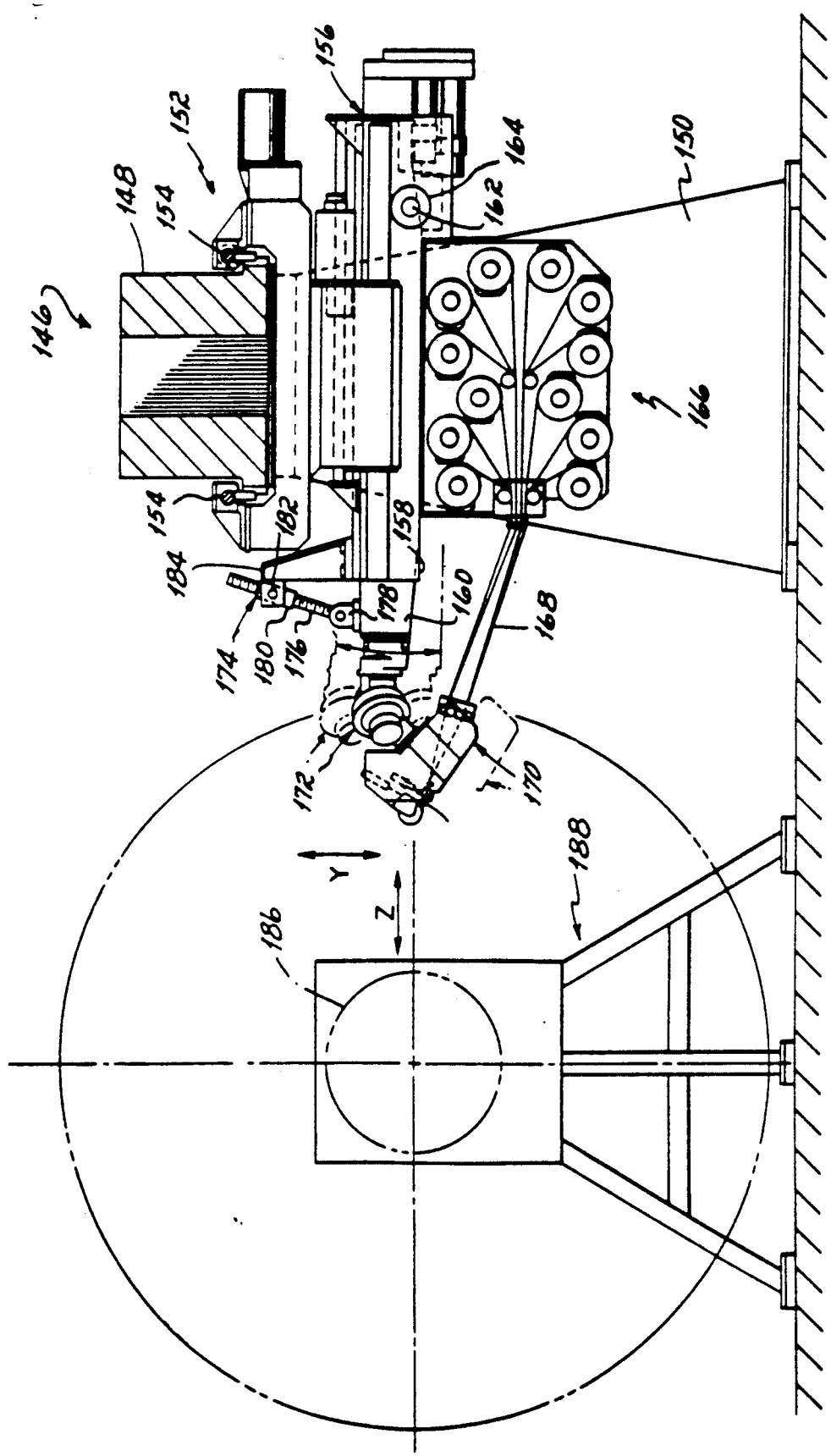
FIG. 4 is a view similar to FIG. 2 of an alternative embodiment of the mechanism for tilting the cross slide.

Referring now to FIG. 4, an alternative embodiment of a fiber placement machine 146 is illustrated. In this embodiment, the fiber placement machine 146 includes an overhead horizòntal support beam 148 supported at opposite ends by a pair of stanchions 150, one of which is shown in FIG. 4. A carriage 152 is longitudinally movable on ways 154 along the support beam 148 and this carriage 152 supports a cross slide 156. The cross slide 156 is comprised of two members including a linearly movable subslide 158 and a pivotable housing 160 supported by the subslide 158. The housing 160 has a pair of trunnions 162 at its rearmost end which are supported in side bearings 164 within the subslide 158. As depicted in FIG. 4, the cross slide 156 mounts a creel assembly 166 which supplies a number of individual tows 168 to a fiber placement head 170 carried on a robotic wrist 172 mounted to the housing 160 of cross slide 156. The fiber placement head 170 lays down these tows 168 side-by-side onto the surface of a mandrel 186 carried on a vertical support 188. The detailed construction and operation of the creel assembly 166, fiber placement head 170 and robotic wrist 172 are similar to that discussed in detail above in connection with the embodiment of FIGS. 1-3.

In the embodiment of FIG. 4, the housing 160 of cross slide 156 is tilted upwardly and downwardly substantially along the Y axis depicted in FIG. 4 by an actuator assembly 174. The actuator assembly 174 includes a ball screw 176 mounted by a trunnion 178 to the cross slide housing 160, and a nut 180 carried on a swivel mount 182 which is connected by a bracket 184 fixedly attached to the subslide 158. In response to rotation of the nut 180, the ball screw 176 is moved upwardly or downwardly relative to the subslide 158 carrying the housing 160 therealong. In turn, the robotic wrist 172 and fiber placement head 170 mounted to the cross slide housing 160 are tilted substantially along the Y axis depicted in FIG. 4.

While the invention has been described with reference to a preferred embodiment, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention not be limited to the particular embodiment disclosed as the best mode contemplated for carrying out this invention, but the invention will include all embodiments falling within the scope of the appended claims.

I claim:

1. A fiber placement machine, comprising:
   a base support having a longitudinal axis;
   a carriage mounted to said base support;
   means for moving said carriage along said longitudinal axis of said base support;
   a cross slide mounted to said carriage and movable therewith along said longitudinal axis of said base support;
   means for selectively and actively pivoting said cross slide with respect to said carriage about a pivot axis which is substantially parallel to said longitudinal axis;
   a multi-axis manipulator mounted to said cross slide and movable therewith;
   a fiber placement head carried by said multi-axis manipulator, said multi-axis manipulator including means for moving said fiber placement head along multiple axes relative to the surface of a mandrel;
   fiber tow supply means carried by said cross slide for supplying a number of individual fiber tows at independent rates to said fiber placement head, said fiber placement head being effective to lay down the fiber tows side-by-side upon the surface of the mandrel to form a fiber band and to compact the fiber band against the surface;
   fiber tow guide means associated with said fiber tow supply means and said fiber placement head for maintaining substantially continuous alignment of said fiber tow supply means and said fiber placement head as said fiber placement head is moved by said multi-axis manipulator with respect to said fiber tow supply means.

2. The fiber placement machine of claim 1 in which said fiber tow guide means comprises a first redirect roller mounted to said fiber tow supply means and a second redirect roller mounted to said fiber placement head, the individual fiber tows from said fiber tow supply means being directed from said first redirect roller to said second redirect roller, said first and second redirect rollers being pivotal relative to one another so that upon movement of said fiber placement head with respect to said fiber tow supply means, said first redirect roller maintains alignment with said second redirect roller to ensure the smooth passage of individual fiber tows therebetween.

3. A fiber placement machine, comprising:
   a base support having a substantially horizontally extending, longitudinal axis;
   a carriage mounted to said base support;
   means for moving said carriage along said longitudinal axis of said base support;
   a cross slide mounted to said carriage and movable therewith along said longitudinal axis of said base support;
   means for selectively and actively tilting said cross slide with respect to said carriage in a reversible, substantially vertical direction about a pivot axis which is substantially parallel to said longitudinal axis;
   means for moving said cross slide with respect to said carriage in a transverse direction which is substantially perpendicular to said longitudinal axis of said base support and substantially perpendicular to said vertical direction;
   a multi-axis manipulator mounted to said cross slide and movable therewith;
   a fiber placement head carried by said multi-axis manipulator, said multi-axis manipulator including means for moving said fiber placement head along multiple axes relative to the surface of a mandrel;
   fiber tow supply means carried by said cross slide for supplying a number of individual fiber tows at independent rates to said fiber placement head, said fiber placement head being effective to lay down the fiber tows side-by-side upon the surface of the mandrel to form a fiber band and to compact the fiber band against the surface;
   fiber tow guide means associated with said fiber tow supply means and said fiber placement head for maintaining substantially continuous alignment of said fiber tow supply means and said fiber placement head as said fiber placement head is moved by said multi-axis manipulator with respect to said fiber tow supply means.

4. The fiber placement apparatus of claim 3 in which said base support comprises:
   a pair of spaced, horizontally extending side rails interconnected by supports;

a horizontally extending way mounted atop each of said side rails.

5. The fiber placement apparatus of claim 3 in which said base support comprises:
- a pair of spaced, horizontally extending side rails interconnected by supports;
- a horizontally extending way mounted atop each of said side rails which support said carriage for movement along said longitudinal axis of said base support.

6. The fiber placement apparatus of claim 5 in which said carriage comprises:
- a pair of laterally spaced, interconnected support beams;
- a pair of bearing blocks mounted at opposite ends of each said support beams, said bearing blocks slidably engaging said ways mounted atop said side rails of said base;
- drive means for moving said support beams relative to said base support so that said bearing blocks slide along said ways of said base support.

7. The fiber placement apparatus of claim 6 in which said drive means comprises:
- a rack mounted to one of said side rails of said base support;
- a motor and gear box fixed to at least one of said support beams;
- a pinion operatively connected to said motor and gear box and drivingly connected to said rack, said motor and gear box being effective to rotate said pinion thereby moving said motor and gear box along said rack and said support beams along said ways.

8. The fiber placement apparatus of claim 6 in which said carriage comprises:
- a pair of spaced side walls, one of said side walls being mounted to each of said support beams;
- drive means mounted to each of said side walls for driving a pinion;
- a pair of vertical columns, each of said vertical columns being mounted to one of said support beams;
- a first bearing mounted atop each of said vertical columns;
- a pair of spaced, interconnected support plates located between said spaced side walls, said support plates each having a forward end, a rearward end and a top portion;
- a first bushing mounted to said top portion of each said support plates at said forward end thereof, and a second bushing mounted to said top portion of each said support plates at said rearward end thereof;
- a pair of second bearings, each of said second bearing being mounted to one of said support plates at the rearward end thereof, each of said second bearings being pivotally connected to one of said first bearings atop said vertical columns;
- a pair of tilt racks, each of said tilt racks being mounted to one of said support plates in a position to drivingly engage said pinions driven by said drive means, whereby said drive means is operative to rotate said pinions to move said tilt racks in a reversible, substantially vertical direction so that said support plates are pivoted on said bearings.

9. The fiber placement apparatus of claim 8 in which said cross slide comprises:
- a housing;
- a pair of ways mounted to opposite sides of said housing, said way on one side of said housing being slidably received by said first and second bushings mounted to one of said support plates and said way on the other side of said housing being slidably received by said first and second bushings mounted to the other of said support plates.

10. The fiber placement apparatus of claim 9 in which said means for moving said cross slide in a transverse direction with respect to said carriage, comprises:
- a screw fixedly mounted to said housing;
- a nut rotatably mounted in a fixed axial position to said carriage, said nut being drivingly engageable with said screw;
- means for rotating said nut with respect to said screw for moving said screw axially relative to said nut, said ways of said housing being movable along said bushings on said support plates to permit transverse motion of said housing with respect to said carriage.

* * * * *